US012670788B2

(12) United States Patent
Gacoin et al.

(10) Patent No.: US 12,670,788 B2
(45) Date of Patent: Jun. 30, 2026

(54) METHOD FOR SECURE DISPLAY OF INFORMATION IN A VEHICLE

(71) Applicants: RENAULT S.A.S, Boulogne Billancourt (FR); NISSAN MOTOR CO., LTD., Yokohama (JP)

(72) Inventors: Nicolas Gacoin, Aubevoye (FR); Jérôme Kunc, Aubevoye (FR)

(73) Assignees: Ampere S.A.S., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 186 days.

(21) Appl. No.: 18/043,494

(22) PCT Filed: Aug. 27, 2021

(86) PCT No.: PCT/EP2021/073767
§ 371 (c)(1),
(2) Date: Feb. 28, 2023

(87) PCT Pub. No.: WO2022/053338
PCT Pub. Date: Mar. 17, 2022

(65) Prior Publication Data
US 2023/0326337 A1 Oct. 12, 2023

(30) Foreign Application Priority Data

Sep. 9, 2020 (FR) ...................................... 2009132

(51) Int. Cl.
G08G 1/0962 (2006.01)
B60W 30/14 (2006.01)
(Continued)

(52) U.S. Cl.
CPC ......... *G08G 1/09623* (2013.01); *B60W 30/14* (2013.01); *B60W 2050/146* (2013.01);
(Continued)

(58) Field of Classification Search
CPC ......... G08G 1/09623; G08G 1/096716; G08G 1/09675; G08G 1/096783; B60W 30/14;
(Continued)

(56) References Cited

U.S. PATENT DOCUMENTS

2011/0128139 A1* 6/2011 Tauchi ................... B60K 35/00
340/439
2013/0110315 A1 5/2013 Ogawa
(Continued)

FOREIGN PATENT DOCUMENTS

DE 11 2016 005 784 T5 9/2018
EP 3 575 175 A1 12/2019
(Continued)

OTHER PUBLICATIONS

Machine translation of JP-4248170-B2 (Year: 2009).*
(Continued)

*Primary Examiner* — Navid Z. Mehdizadeh
*Assistant Examiner* — Caitlin R Mccleary
(74) *Attorney, Agent, or Firm* — Oblon, McClelland, Maier & Neustadt, L.L.P.

(57) ABSTRACT

Method for secure display of information in a vehicle fitted with a driver assistance system enabling detection of a connected infrastructure element that is likely to have a plurality of statuses and estimation of temporal proximity to the infrastructure element, the method including securing the display of information relating to driving events displayed on a display unit of the system.

13 Claims, 7 Drawing Sheets

(51) Int. Cl.
  *B60W 50/14* (2020.01)
  *B60W 50/16* (2020.01)

(52) U.S. Cl.
  CPC ......... *B60W 50/16* (2013.01); *B60W 2520/10*
    (2013.01); *B60W 2540/22* (2013.01); *B60W*
      *2540/229* (2020.02); *B60W 2554/802*
        (2020.02); *B60W 2555/60* (2020.02)

(58) Field of Classification Search
  CPC ........... B60W 50/16; B60W 2050/146; B60W
      2520/10; B60W 2540/22; B60W
      2540/229; B60W 2554/802; B60W
      2555/60; B60W 2420/403; B60W
      2050/143; B60W 2540/221; B60W
    2540/225; B60W 30/181; B60W 2556/45;
      B60W 30/18154; B60W 50/0097; B60W
      60/0021; B60W 2552/00; B60W 50/14;
        B60W 40/02; B60W 40/08; B60W
      40/105; B60W 2040/0872; B60K 35/00;
        B60K 35/29; G06V 20/58
  See application file for complete search history.

(56)       References Cited

U.S. PATENT DOCUMENTS

| | | | | |
|---|---|---|---|---|
| 2016/0125250 A1* | 5/2016 | Max | ..................... | H04N 23/661 |
| | | | | 345/633 |
| 2016/0180710 A1* | 6/2016 | Maeda | ............. | G08G 1/096783 |
| | | | | 340/932 |
| 2017/0043715 A1* | 2/2017 | Osugi | ...................... | B60Q 9/00 |
| 2018/0362053 A1 | 12/2018 | Isa et al. | | |
| 2019/0180617 A1* | 6/2019 | Hori | ................. | B60W 50/0097 |
| 2019/0367016 A1 | 12/2019 | Brannstrom et al. | | |
| 2020/0344532 A1* | 10/2020 | Iwanski | ................... | G09G 5/00 |

FOREIGN PATENT DOCUMENTS

| | | | | |
|---|---|---|---|---|
| JP | 2001165670 A | * | 6/2001 | |
| JP | 4248170 B2 | * | 4/2009 | |

OTHER PUBLICATIONS

Machine translation of JP-2001165670-A (Year: 2001).*
International Search Report mailed on Nov. 18, 2021 in PCT/
EP2021/073767 filed on Aug. 27, 2021 (2 pages).
Preliminary French Search Report mailed on May 31, 2021 in FR
2009132 filed on Sep. 9, 2020 (3 pages), with Translation of
Category of Cited Documents.

* cited by examiner

METHOD FOR SECURE DISPLAY OF INFORMATION IN A VEHICLE

BACKGROUND

The invention relates to a method for the secure display of information in a vehicle. The invention relates also to a driver assistance system of a vehicle and to a vehicle comprising such an assistance system. The invention relates also to a computer program implementing the method mentioned.

Driving assistance technologies are increasingly widely used and are no longer limited to high-end vehicles. These technologies make it possible to simplify the driving of motor vehicles and/or make the behaviors of the drivers of said vehicles more reliable. In particular, the driving assistance systems enhance the comfort and the safety of the users by generally regulating the speed of the vehicle. Such is notably the case with assistance methods and systems such as the systems for recommending an optimal longitudinal speed as a function of traffic lights, also known by the acronym "GLOSA", which stands for "green light optimal speed advisory", or adaptive speed regulators of "ACC" type, ACC standing for "Adaptative Cruise Control".

Such systems conventionally comprise interface systems comprising display modules of screen types broadcasting the information relating to real-time and/or future driving events. Such display modules can nevertheless cause the alertness of the driver to drop by diverting his or her attention from the traffic lane and by thus provoking abnormal behaviour likely to lead to an accident.

BRIEF SUMMARY

The invention falls within this context and aims to provide a method for the secure display of information in a motor vehicle and a driving assistance system capable of implementing such a method.

The invention proposes a method for the secure display of information in a vehicle fitted with a driving assistance system, the method comprising the following steps:

- a step of detection of an infrastructure element, notably a connected traffic light, likely to have a plurality of statuses;
- a step of transmission of data, relating to the infrastructure element, to the vehicle and of display of information relating to driving events on a display module of a driving assistance system as a function of said transmitted data;
- a step of location of the vehicle relative to the infrastructure element;
- a step of estimation, in real time, of a time remaining $T_i$ for the vehicle to reach the infrastructure element by taking into account a longitudinal speed of the vehicle;
- a step of securing of the display of information;

the securing step comprising a sub step of switching off of the display of information of the display module and being triggered when the remaining time $T_i$ separating the vehicle from the infrastructure element is equal or substantially equal to a predetermined limit time $T_L$ separating the vehicle from the structure element.

According to the invention, the method comprises a step of updating of the status of the infrastructure element comprising at least one sub step of alerting of an imminent change of status of the infrastructure element from a first status to a second status via an alert signal comprising a light and/or sound and/or haptic signal.

The method can comprise at least one sub step of checking of the alertness of the driver by a driver state monitoring unit.

According to an optional feature, the sub step of checking of the alertness of the driver can comprise a phase of monitoring of at least one physiological parameter of the driver by means of at least the driver monitoring unit and a phase of detection of an overshoot of the parameter and/or of a combination of parameters by a value less than or greater than a threshold value.

According to an optional feature, the step of securing of the display of information can comprise a sub step of issuing of at least one alert message to a driver of the vehicle when an overshoot of the parameter and/or of the combination of parameters is detected in the checking sub step, the alert message comprising a light and/or sound and/or haptic signal.

Notably, the limit time $T_L$ can be of the order of 2 to 3 seconds.

According to an optional feature, the step of detection of the infrastructure element can comprise a sub step of selection of the infrastructure element from among a plurality of infrastructure elements according to a position of the infrastructure element relative to a lane and/or roadway travelled by the vehicle and/or according to the spatial and/or temporal proximity of the infrastructure element relative to the vehicle.

According to an optional feature, all or part of the securing step can be implemented only when the vehicle is moving at a speed greater than or equal to 15 km/h.

The step of updating of the status of the infrastructure element can comprise, following the alerting sub step, a sub step of verification of a behavior of the driver by the measurement of at least one physiological parameter of the driver by means of at least one monitoring unit and, when an overshoot of the parameter and/or of a combination of parameters by a value less than or greater than a threshold value is detected, a sub step of reminding of the change of status of the infrastructure element and/or of alertness.

The present invention relates also to a motor vehicle driving assistance system comprising hardware and/or software elements implementing the method as previously explained, the hardware elements comprising at least a location means, a means for detecting a connected infrastructure element, a communication module, a data processing unit, a driver state monitoring unit and a display module of the assistance system.

The invention further proposes a computer program product comprising program code instructions stored on a computer-readable medium for implementing the steps of the method of the invention when said program runs on a computer or computer program product that can be downloaded from a communication network and/or stored on a computer-readable data medium and/or that can be run by a computer, the program being characterized in that it comprises instructions which, when the program is run by the computer, cause the latter to implement the method according to the invention.

BRIEF DESCRIPTION OF THE DRAWINGS

Other details, features and advantages will emerge more clearly on reading the detailed description given hereinbelow, as an indication and in a non-limiting manner, in relation to the various exemplary embodiments illustrated in the following figures.

DETAILED DESCRIPTION

Figure 1:
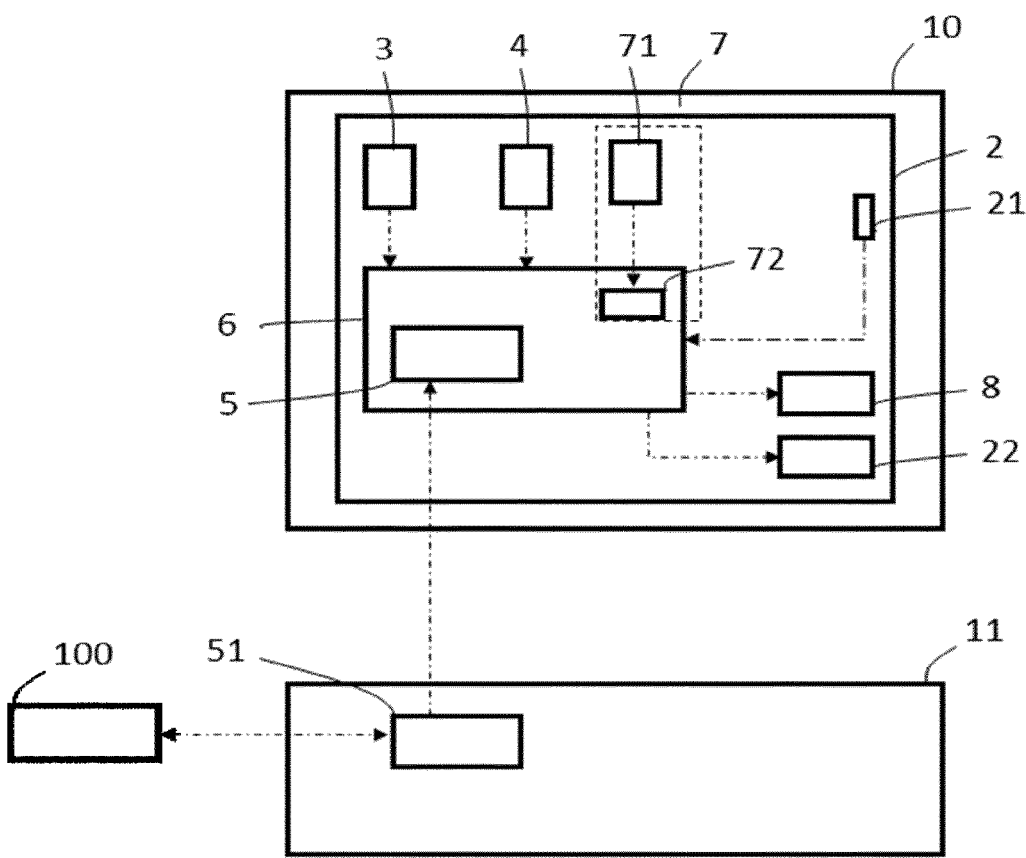
FIG. 1 schematically represents an embodiment of a vehicle fitted with a means for implementing a method for the secure display of information in a vehicle.

FIG. 1 illustrates an embodiment of a vehicle 10 fitted with a means for implementing a method for the secure display of information 1 in a vehicle as described herein-below with reference to FIGS. 2 to 7. Such a method for secure display 1 is intended to be incorporated in a driving assistance system 2. For example, the assistance systems considered can be, preferentially, an optimal longitudinal speed advice system, of the vehicle 10, of GLOSA ("Green Light Optimal Speed Advice") type or else a contextual distance regulation system of ACC, "Adaptative Cruise Control", type.

The vehicle 10 is a motor vehicle of any type, notably a passenger vehicle or a utility vehicle. The vehicle 10 comprises the motor vehicle driving assistance system 2 which comprises hardware and/or software elements implementing the method according to the invention. Said hardware elements comprise at least a location means 3, a means 4 for detecting a connected infrastructure element 11, a communication module 5, a data processing unit 6, a driver state monitoring unit 7 and a display module 8 of the assistance system 2.

The location means 3 allows the vehicle 10 to be located in the road infrastructure. It incorporates, for example, an approximate vehicle 10 location system and/or a high-definition mapping of the road infrastructure. In particular, the approximate location of the vehicle 10 can be supplied by a system of GPS, "Global Positioning System", type. The approximate location of the vehicle 10 makes it possible to fetch from a mapping data base the information concerning the road infrastructure within a radius of a few hundred meters around the approximate position of the vehicle 10. Alternatively or in addition, the location means 3 can be a location system embedded in the vehicle 10 which integrates the movements of the vehicle 10 permanently.

The detection means 4 is configured to detect at least one connected infrastructure element 11.

A connected infrastructure element 11 is understood to be an infrastructure element that can be linked to a remote server 100 and/or exchange information with the vehicle 10. The infrastructure element 11 can be mobile or, preferentially, fixed.

The infrastructure element comprises at least one communication device 51 configured to transmit and receive data with the server 100 and/or send data to the vehicle, notably periodically. Such data can comprise an identifier of the infrastructure element 11, a positioning and/or a current status of the infrastructure element 11. Notably, the connected infrastructure element is likely to have a plurality of statuses.

"Statuses" are understood to mean different states of the infrastructure element affecting the vehicle traffic on the traffic lane. As an example, the infrastructure element 11 considered can be a traffic light, a railway crossing barrier or bridge or any other road infrastructure traffic regulation element likely to be connected and to have different status. The status of such infrastructure elements 11 is then relative to a color of the traffic light or to the state of opening or of closure of the barrier. Preferentially, the infrastructure element 11 transmits the data relating to it in real time. The detection means 4 of the system according to the invention can notably be configured to detect an outgoing data signal transmitted by the connected infrastructure element 11. The detection means 4 can notably be included in the communication module 5 of the system.

Optionally, the detection means 4 can, in addition, comprise a camera, not represented, so as to optimize the detection and/or the selection of the infrastructure element 11. Such a camera can be fixed in such a way that it is able to acquire images of a portion of a traffic lane, on which the vehicle 10 is moving, which is situated in front of the vehicle 10. This camera can thus be fixed to the front of the vehicle 10, for example at the front headlights, or in the vehicle interior, notably behind the windshield, or even on a roof of the vehicle 10. Such a camera is capable of supplying signals representative of an image which can then be transmitted to the processing unit 6 for the processing and/or archiving of the images. Such an arrangement makes it possible to supply the processing unit 6 with additional information relating to connected or non-connected infrastructure elements of the road infrastructure, for example so as to optimize the detection of the relevant infrastructure element or elements.

The communication module 5 allows the vehicle 10 to receive the data from the infrastructure element 11 by means of a wireless, low-frequency or high-frequency link. It can, for example, be a wireless link based on the "cellular" or "WiFi" technologies for example. In this particular case, upon the implementation of the method according to the invention, such a communication module 5 does not handle the transmission of information from the vehicle 10 to the infrastructure element 11.

The processing unit 6 comprises at least one computation unit comprising hardware and software resources, more specifically at least one processor, or microprocessor, cooperating with memory elements.

This computation unit is able to execute instructions for the implementation of a computer program.

The monitoring unit 7 is configured to monitor a driver state and allow the detection of a state of lowering of alertness thereof. A state of lowering of alertness is understood to mean a physical or physiological state of the driver which is likely to disturb him or her or even hinder him or her in the context of safe driving of the vehicle 10. Such a state corresponds, in a non-limiting and non-exhaustive manner, to a state of distraction.

The monitoring unit 7 comprises at least one driver monitoring sensor 71, notably a camera inside the vehicle 10, configured to detect the state of the driver. The at least one monitoring sensor 71 can be arranged in the interior of the vehicle 10. Such at least one driver monitoring sensor 71 is notably able to measure at least one physiological parameter of the driver out of the direction of gaze, the orientation or the movement of the head.

The monitoring unit 7 also comprises a processing module 72 capable of performing computation operations allowing the state of lowering of alertness of the driver to be identified. Thus, the monitoring unit 7 is capable of identifying an alteration of the behavioral conditions of the driver and therefore of the driving mode that he or she is adopting or likely to adopt. In particular, the processing unit 72 can be incorporated in the processing unit 6.

The vehicle 10 comprises a display module 8 of the assistance system 2. The display module 8 can comprise a screen capable of broadcasting at least information relating to driving instructions and/or a vehicle 10 location mapping of the driving assistance system and/or of the location means 3.

Furthermore, the vehicle 10 can comprise, optionally but preferentially, a member for determining a longitudinal speed of the vehicle 10, that is to say a speed of displacement of the vehicle 10. For example, the longitudinal speed determination member can comprise a speed sensor 21.

Also, the system can be configured so as to incorporate a warning module 22 capable of broadcasting information. The warning module 22 can notably broadcast a message and/or a signal in the form of a:

sound emission, for example by means of a loudspeaker, and/or visual emission, for example by means of the display module 8 of screen type, and/or haptic emission, for example vibratory, for example by means of an element capable of emitting vibrations included in the driver seat or in at least one control element of the vehicle 10, for example the steering wheel.

The driving assistance system 1 can also comprise a memory or storage space constituting a storage medium that can be read by a computer or by the calculator of the processing unit comprising instructions which, when they are executed by the computer or the calculator, cause the latter to implement the method as described hereinbelow.

In such a system 1 as illustrated in FIG. 1, the processing unit 6 is linked to the detection means 4 and to the communication module 5 so as to receive and process the information relating to the infrastructure element or to the infrastructure elements 11. Furthermore, the processing unit 6 is linked to the location means 3. The processing unit 6 is also connected to the warning module 22. Finally, the processing unit 6 is, directly or indirectly, linked to the different sensors, for example the monitoring 71 or speed 21 sensor or sensors so as to receive the information relating to the driver or the longitudinal speed of the vehicle in real time.

For all of the following description, it is assumed that the motor vehicle 10 is traveling on a traffic lane which comprises, imminently, an infrastructure element 11, in this case a traffic light. The term "imminently" refers to a temporal proximity criterion. It means that the time that the vehicle 10 would take to reach the infrastructure element 11 is less than a given threshold.

Figure 2:
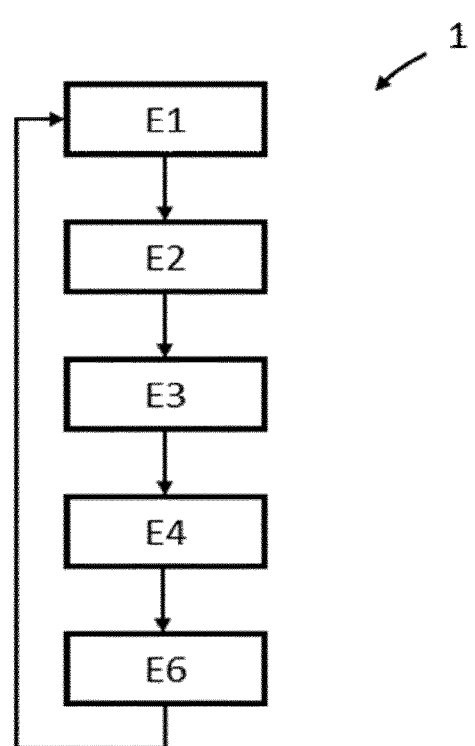
FIG. 2 is a general flow diagram of a mode of execution of the method for the secure display of information.

Two modes of execution of the method for the secure display of information 1 are described hereinbelow with reference to FIGS. 2 to 4.

The display method 1 can also be considered to be a method of operating a driving assistance system or as a method of operating a motor vehicle 10 fitted with such a system, the display method 1 notably making it possible to secure the display of information when a driving assistance method is implemented, that is to say during execution.

It should be noted that, during the execution of such a display method 1, the vehicle 10 transmits in real time a position of the vehicle 10 in the road infrastructure via a location means 3.

The display method 1 according to the invention comprises, initially, a step of detection E1 of a connected infrastructure element 11, notably an infrastructure element likely to change status.

In such a detection step E1, the detection means 4 detects an approaching infrastructure element 11. According to different alternatives, the one or more detection means 4 as previously explained pick up an outgoing data stream transmitted by a communication device 51, specific to the infrastructure element 11, notably to a server and/or to the vehicle, and/or the one or more detection means 4 capture images of the infrastructure element 11. The detection means 4 transmits this information to the processing unit 6 which, by implementing at least one algorithm, for example of analysis of the distance relative to the infrastructure element 11 and/or of image processing, detects or does not detect the approaching infrastructure element 11.

For example, the detection means 4 and/or the system can be configured so as to detect an infrastructure element 11 having a spatial and/or temporal proximity relative to the vehicle 10. As an example, the detection means 4 and/or the system can be configured so as to detect an infrastructure element 11 present at a detection distance $D_d$ lying between 25 and 500 m and/or at a detection time Td, corresponding to a time remaining for the vehicle 10, at its current longitudinal rolling speed, before reaching the infrastructure element 11, lying between 2 and 60 s.

In other words, the detection means 4 detects one or more infrastructure elements present within a spatial and/or temporal perimeter surrounding the vehicle 10.

Optionally but preferentially, the detection step E1 can comprise a sub step of selection E11 of the infrastructure element 11 from among a plurality of infrastructure elements. Notably, such a selection can be made on the basis of a position of the infrastructure element 11 relative to a lane and/or roadway traveled by the vehicle 10 and/or according to the spatial and/or temporal proximity of the infrastructure element 11 relative to the vehicle 10.

For example, the infrastructure element 11 can be selected from among the plurality of infrastructure elements on the basis of its positioning on the traffic lane traveled by the vehicle rather than on a cross traffic lane and/or on the basis of its positioning on a forward portion of the roadway, extending in front of the vehicle 10, rather than on a rearward portion of the roadway. Optionally, the selection sub step E11 can take into account a path pre-programmed in the location means 3.

Once the relevant infrastructure element 11 is detected, a step of transmission E2 of data and of display of information relating to driving events as a function of said transmitted data is implemented. In such a step, the communication device 51 of the infrastructure element 11 transmits to the communication module 5 of the vehicle 10, for example included in the processing unit 6, the data relating to the infrastructure element 11 and then the information relating to the driving events, derived from the transmitted data, is displayed on the display module 8 of the driving assistance system 2.

Notably, such data can comprise an identification, or ID, of the infrastructure element 11, an exact position of the infrastructure element 11, a status of the infrastructure element 11 and/or a time remaining before a next change of status of the infrastructure element 11 and/or a combination of an elapsed time since the last change and a period specific to a status of the infrastructure element. As an example, "status" is understood to mean a color of a traffic light, a "closed" or "open" state of a movable barrier marking a railway line, a bridge or any other traffic lane.

According to a preferential exemplary embodiment in which the infrastructure element 11 is a traffic light, the data transmitted to the vehicle 10 in the search and transmission step comprise at least an identifier of the infrastructure element 11, a position of the infrastructure element 11, a current status, in real time, of the infrastructure element 11 and/or a time remaining before a change of the infrastructure element 11 to a second status, distinct from the current status.

The method then implements a step of location E3 of the vehicle 10 relative to the infrastructure element 11. This step aims to define the position, in real time, of the vehicle 10 moving in the road infrastructure and with respect to the infrastructure element 11 on the basis of the vehicle 10 location information transmitted at all times by the location means 3, and of the positioning data of the infrastructure element 11 previously transmitted in the step E2.

These data and information are transmitted to the processing unit 6 which, using the longitudinal speed data of the vehicle 10, for example transmitted by the speed sensors 21, implements a step of estimation E4, in real time, of a temporal proximity of the infrastructure element 11. "Temporal proximity" is understood to mean a time remaining $T_i$ for the vehicle 10 to reach the infrastructure element 11 for a detected longitudinal speed.

In other words, in the execution of the method according to the invention, the system performs, in real time, on the one hand, the step of estimation E4 of the time remaining $T_i$ for the vehicle 10 to reach the infrastructure element 11 and, on the other hand, a step of comparison E41 of such a remaining time $T_i$ with a reference limit time $T_L$.

The method is also configured to implement a step of securing E6 of the display of information. It should be noted that, in the different figures, the estimation step E4 is represented as preceding the securing step E6, but nevertheless, the updating of the remaining time $T_i$ can continue parallel to the implementation of the securing step E6.

The securing step is triggered when the remaining time $T_i$ separating the vehicle 10 from the infrastructure element 11 is equal or substantially equal to the predetermined limit time $T_L$, separating the vehicle 10 from the structure element. The limit time $T_L$ is an optimal time remaining before reaching the infrastructure element 11 which makes it possible to ensure that the driver can react appropriately in response to the implementation of the securing step and before reaching the infrastructure element 11.

According to a preferential embodiment, such a limit time is of the order of 2 to 3 s. The securing step E6 can thus be implemented for all or part of a time period lying between a remaining time $T_i$ equal to the limit time $T_L$ and a zero remaining time $T_i$ corresponding to a positioning of the vehicle in line with the infrastructure element.

The initiation of the securing step E6 on the basis of the temporal proximity of the infrastructure element, depending on the longitudinal speed of the vehicle 10, instead of a predetermined spatial proximity, advantageously makes it possible to make the method 1 suitable for variable traffic conditions, notably variable traffic densities. Also, the method according to the invention does not require the integration of steps of detection of additional parameters relating to the traffic such as the presence of vehicles, traveling or stopped, on the roadway or in proximity to the infrastructure element 11.

Advantageously, the definition of a fixed predetermined limit time, that is to say one that is constant and non-variable, helps to accustom the driver to the securing system according to the invention as it is used. That way, the behavior of the driver adapts to the operation of the method and gradually anticipates the implementation of the securing step E6 on approaching infrastructure elements 11, thus reinforcing his or her alertness by force of habit.

The securing step E6 comprises a sub step of switching off E6 of the display of the information on the display module 8 of the driving assistance system 2. In other words, the processing unit 6 controls the switching off of the display module 8, notably of at least the information relating to driving events.

Figure 3:
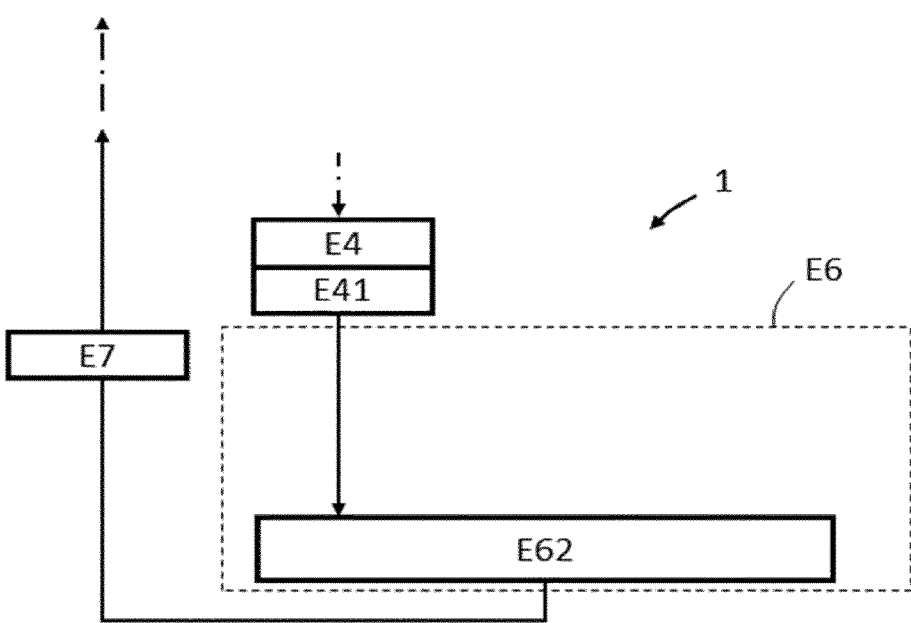
FIG. 3 is a flow diagram detailing a securing step of a first mode of execution of the method for the secure display of information.

Notably, according to the first mode of execution illustrated in FIG. 3, the switching-off sub step E62 can thus be implemented when the remaining time $T_i$ separating the vehicle 10 from the infrastructure element 11 is equal or substantially equal to the predetermined limit time $T_L$, separating the vehicle 10 from the structure element.

Figure 4:
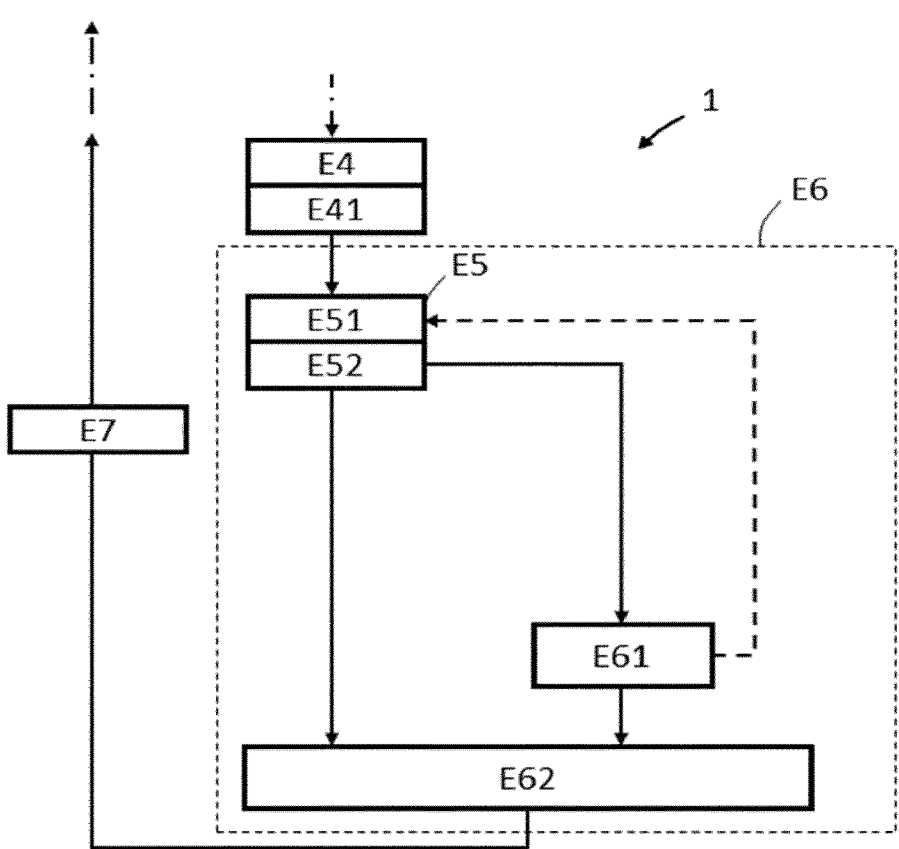
FIG. 4 is a flow diagram detailing a securing step of a second mode of execution of the method for the secure display of information.

According to a second mode of execution of the method, illustrated in FIG. 4, the securing step E6 can, optionally, comprise a sub step of checking E5 of the alertness of the driver by the driver state monitoring unit 7. Notably, such a checking sub step E5 can, preferentially, be implemented prior to the switching-off sub step E62.

Thus, for example, when the remaining time $T_i$ is equal, or substantially equal, to the limit time $T_L$, the system initiates the checking sub step E5. If, on the other hand, the remaining time $T_i$ is greater than the limit time $T_L$, then the method repeats the step of estimation E4, in real time, of the remaining time $T_i$ so as to allow it to be updated as a function of the movement and of the position of the vehicle 10.

The sub step of checking E5 of the alertness of the driver can comprise a phase of monitoring E51 of at least one physiological parameter of the driver by means of at least the monitoring unit 7 as previously explained. Each parameter is detected and/or measured by one or more driver monitoring sensors 71, included in the monitoring unit 7, which are linked to the processing module 72, for example included in the processing unit 6. As an example, the monitoring unit 7 of the vehicle 10 can capture images of the driver, notably of the gaze of the driver which are then transmitted to the processing unit 6, which is equipped with at least one image analysis algorithm.

The checking sub step E5 can then comprise a phase of detection E52 of an overshoot of the parameter and/or of a combination of parameters by a value less than or greater than a threshold value, by the processing unit 6. In other words, the processing unit 6 is able to perform computation and comparison operations specifically to determine if the parameter or parameters supplied by the sensor or sensors overshoots/overshoot, by a greater or lesser value, at least one given threshold and thus allow the identification, if appropriate, of a state of lowering of alertness of the driver.

In such a mode of execution, the securing step E6 can, in addition, comprise one or more sub steps likely to be implemented conditionally according to the result of the sub step of checking E5 of the state of alertness of the driver and/or according to one or more of the modes of operation implemented by the display method 1 and/or the system. Notably, according to an example of mode of operation, the step of securing E6 of the display of information can comprise a sub step of issuing E61 of at least one alert message to the driver of the vehicle 10 when an overshoot of the parameter and/or of the combination of parameters is detected in the checking sub step E5.

To do this, the processing unit 6 generates an alert message which is transmitted to the warning module 22 designed to broadcast information contained in this message to the driver in order to redirect his or her attention to the traffic lane. This alert message can, as previously explained, comprise a light signal, for example displayed on the display module 8 of the assistance system 2, and/or a sound signal, for example transmitted via a loudspeaker, and/or a haptic signal, that can notably be implemented by the seat of the driver and/or the steering wheel, as previously explained.

In particular, the sub step of switching off E62 of the display of the information on the display module 8, notably relating to driving events, of the driving assistance system 2 can be conditioned by the checking sub step E5.

Notably, on the basis of the information transmitted by the monitoring unit 7, the processing unit 6 can thus directly implement the switching off of the display module 8 when the remaining time $T_i$ is equal or substantially equal to the limit time $T_L$ and no overshoot of the parameter and/or of the combination of parameters is detected in the checking sub step E5.

Conversely, when the remaining time $T_i$ is equal to the limit time $T_L$ and an overshoot of the parameter and/or of the combination of parameters is detected in the checking sub step E5, the processing unit 6 can execute the sub step E61 and order the issuing of a message by the warning module 22. The processing unit 6 can then execute the sub step E62 and check the switching off of the display module 8 directly following the issuing sub step E61.

Alternatively, as represented in the different figures by a bold dotted arrow, the processing unit 6 can execute the sub step E62 when it no longer detects an overshoot of the parameter and/or of the combination of parameters. In other words, the checking sub step E5 can then be repeated following the alerting sub step E61 in order to update, in real time, a measurement of the state of alertness of the driver and implement the switching-off sub step E62 only when the parameter and/or the combination of parameters has or have an acceptable value.

As an example, the switching-off sub step E62 is implemented when the system detects that the gaze, and therefore the attention, of the driver is on the traffic lane and not the display module 8.

Such an arrangement prevents a possible distraction of the driver by the display module 8 during a most critical period, in this case on approaching the infrastructure element 11, and makes it possible to direct the attention of the driver to the traffic lane.

It should be noted that, if the display of the information and/or data relating to the infrastructure element 11 is interrupted, such is not the case with the transmission of data relating to the infrastructure element 11 from the fixed communication module 5 of said infrastructure element 11 to the communication module 5 of the vehicle 10. In other words, the method according to the invention can handle the steps of transmission E2, location E3 and estimation E4 even on immediate approach to the infrastructure element 11, that is to say even when the remaining time $T_i$ is less than the limit time $T_L$ in order to ensure the updating of the vehicle position data and remaining time $T_i$ data in real time.

Independently of the mode of execution, the method can, in addition, comprise a state of switching on again E7 of the display module 8 that can be implemented according to different alternatives:

the display module 8 can be switched on again when the time remaining time $T_i$ for the vehicle 10 to reach the infrastructure element 11 is zero, that is to say when the vehicle 10 is in line with said infrastructure element 11; or the display module 8 can be switched on again when the location module of the vehicle 10 transmits a position of the vehicle 10 indicating that the position of the infrastructure element 11 has been passed; or the display module 8 can be switched on again when another infrastructure element 11 is detected, that is to say simultaneously with the detection step E1 of a new cycle of the method.

Figure 5:
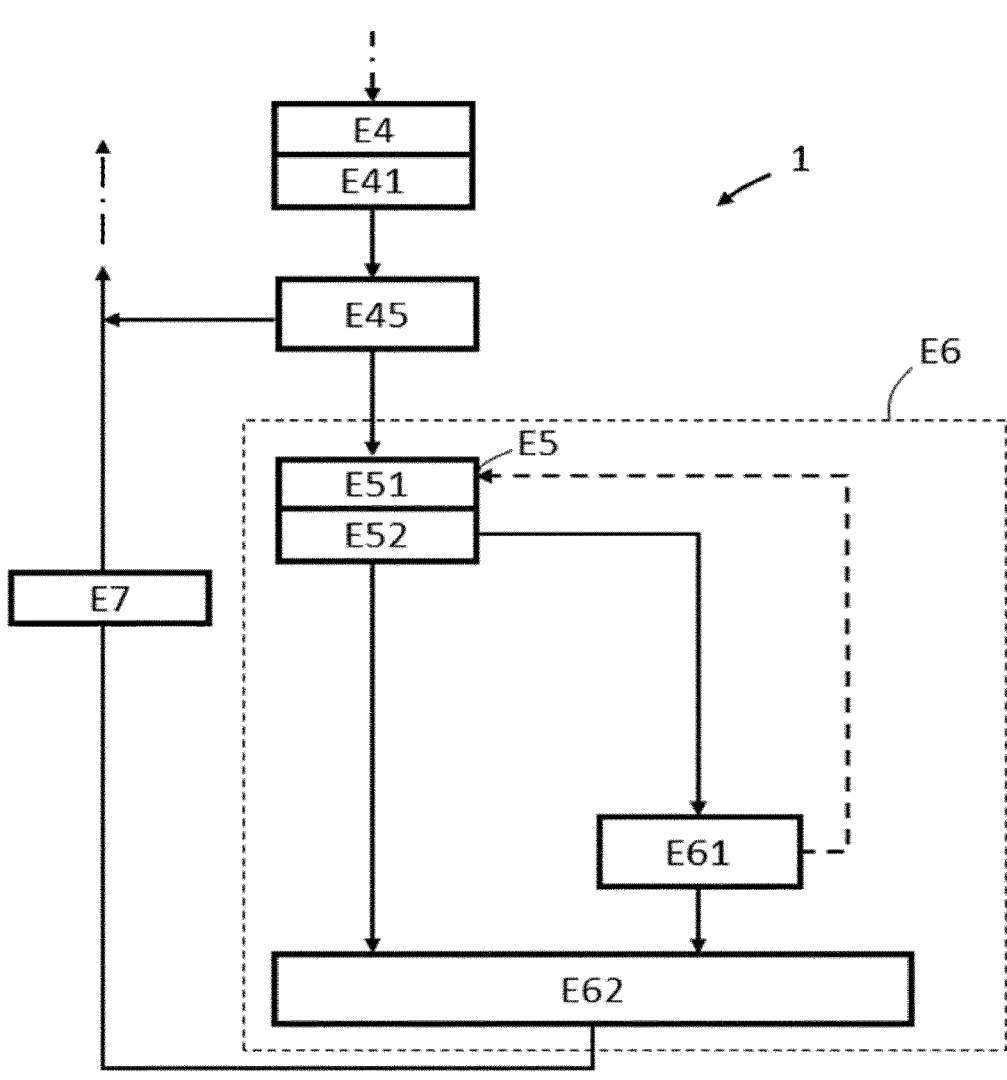
FIG. 5 is a flow diagram detailing the securing step of a first variant of execution of the method for the secure display of information.
Figure 6:
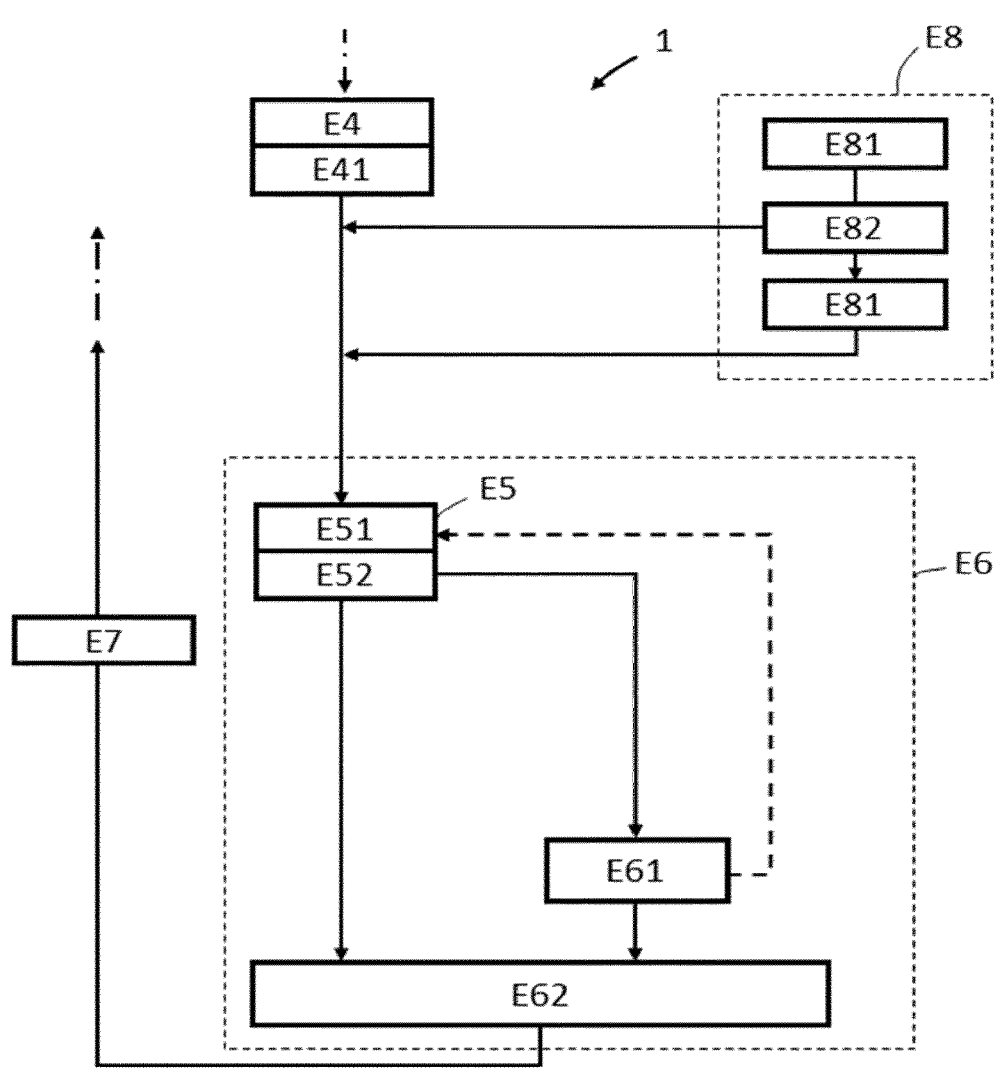
FIG. 6 is a flow diagram detailing a securing step of a second variant of execution of the method for the secure display of information.
Figure 7:
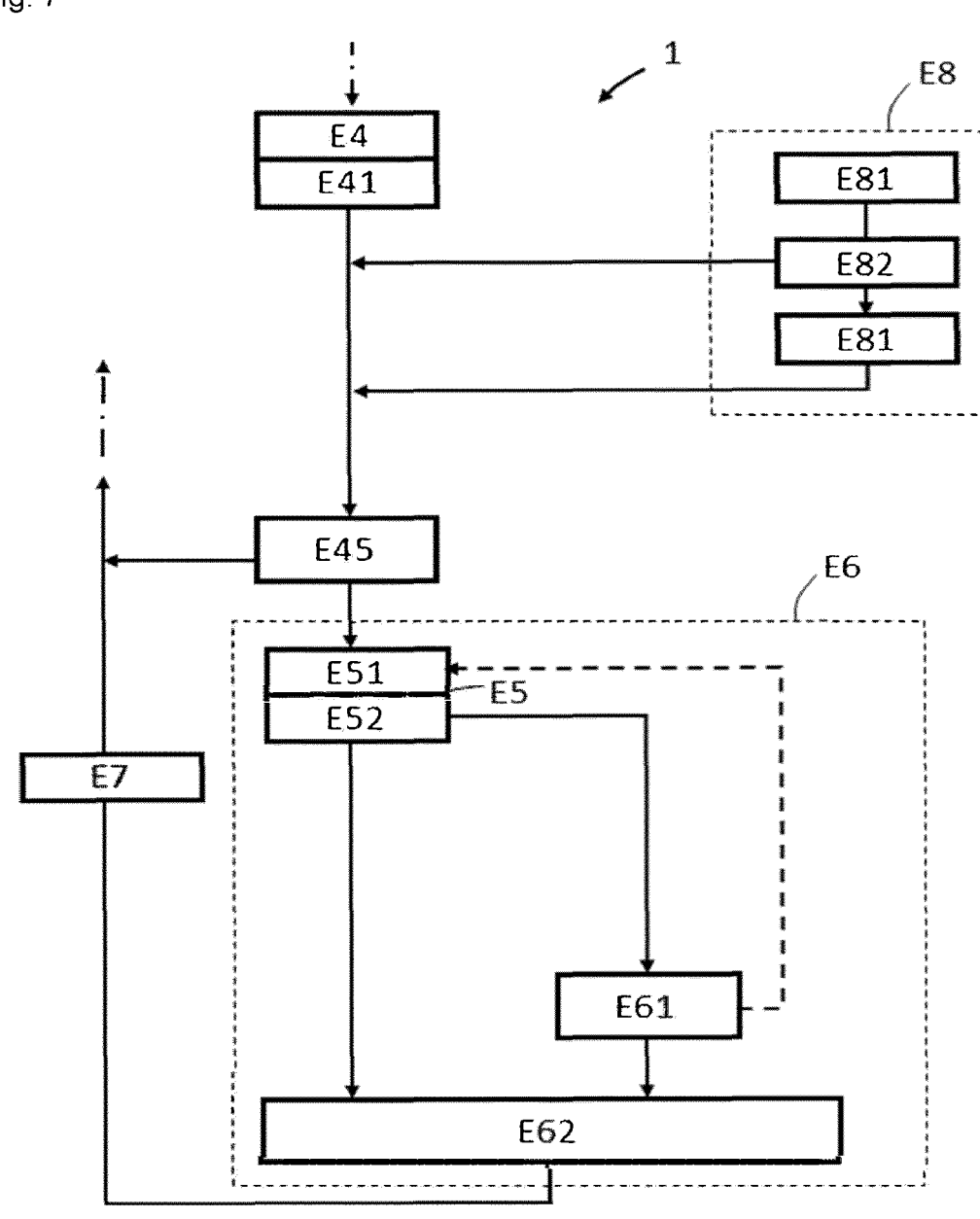
FIG. 7 is a flow diagram detailing a securing step of a third variant of execution of the method for the secure display of information.

FIGS. 5 to 7 illustrate different variant executions of the method according to the invention, such variants being notably incorporated in the second mode of execution as explained above. It is nevertheless understood that each of said variants can also be incorporated mutatis mutandis in the first mode of execution as previously described with reference to FIG. 3.

Advantageously, as illustrated in FIGS. 5 and 7, all or part of the securing step E6 can be implemented only when the vehicle 10 is moving at a speed greater than or equal to 15 km/h. In other words, the method comprises a step, optional, of evaluation and of comparison E45 of the longitudinal speed of the vehicle to a predetermined threshold value, in this case 15 km/h.

As an example, the issuing sub step E61 can be implemented only when the vehicle 10 is moving at a speed greater than or equal to 15 km/h.

Optionally but preferentially, the switching-off sub step E62 is implemented only when the vehicle 10 is moving at a speed greater than or equal to 15 km/h. Thus, the display module 8 can remain operative when the vehicle 10 is stopped or moving at a low longitudinal speed.

In the example illustrated, such an evaluation and comparison step E45 is illustrated, for the purposes of clarity, as preceding the securing step E6. Notably, the comparison step E45 can be performed prior to the checking sub step E5 so that, if the vehicle is moving at a speed less than 15 km/h, the switching-off sub step 62, the issuing sub step E61 and the step of switching on again E7 are not implemented. It is nevertheless understood that such an evaluation and comparison step E45 can be performed simultaneously with the checking sub step E5, that is to say that it is implemented when the remaining time $T_i$ separating the vehicle from the infrastructure element 11 is equal or substantially equal to the predetermined limit time $T_L$.

Optionally, as illustrated in FIGS. 6 and 7, the method can comprise a step of updating E8, in real time, of the status of the infrastructure element 11.

Notably, such an updating step E8 can be performed simultaneously with the location step E3 and/or the estimation step E4 and/or the securing step E6.

In the example illustrated, the updating step E8 is represented simultaneously with the estimation step E4, but it is nevertheless understood that such a representation is in no way limiting and that the updating step E8 can be implemented at any moment following the transmission step E2, that is to say between the transmission step E2 and the passing of the vehicle in line with the infrastructure element.

Notably, the updating step E8 comprises a sub step of alerting E81 of an imminent change of status of the infrastructure element 11 via an alert signal comprising a light and/or sound and/or haptic signal broadcast by the warning module 22.

A "change of status" is understood for example to mean the transition from a first status to a second status as previously explained. For a traffic light, a green light will for example be qualified as "first status", and a stop light as "second status", for example orange or red. "Imminent" is understood to mean that a remaining time $T_s$ for the current status of the infrastructure element, namely the first status, is equal or substantially equal to a predetermined threshold time $T_{LS}$ at which the alerting sub step is implemented. As an example, such a threshold time $T_{LS}$ can be of the order of 3 s before a change of status of the infrastructure element.

In other words, the alerting sub step E81 comprises, prior to the issuing of an alert signal, a phase of reception of updated data relating to the infrastructure element and a phase of comparison of the remaining time $T_s$ for the current status with the threshold time $T_{LS}$, that are not illustrated. Furthermore, depending on the type of data transmitted by the infrastructure element, the phase of reception of updated data can be followed by a phase of computation of the remaining time $T_s$ for the current status.

Optionally but preferentially, the step of updating E8 of the status of the infrastructure element can comprise, following the alerting sub step E81, a sub step of verification E82 of a behavior of the driver, notably of his or her recognition of an imminent change of status of the infrastructure element and/or of his or her alertness. Such a verification sub step E82 is similar to the checking sub step E5 as previously detailed, so all of the description relating to this step applies mutatis mutandis to the verification step E82.

The verification step E82 comprises a step of monitoring, not illustrated, of at least one physiological parameter of the driver by means of at least the monitoring unit 7 and a phase of detection, by the processing unit 6, of an overshoot of the parameter and/or of a combination of parameters by a value less than or greater than a threshold value.

The updating step E8 can, optionally, comprise a sub step of reminding E83 of the change of status of the infrastructure element and/or of alertness in order to ensure that the information has indeed been taken into account by the driver and/or that the attention of the driver is indeed directed to the traffic lane. Such a reminding sub step is notably executed when an overshoot of the parameter and/or of the combination of parameters is detected and contributes to making the driving of the driver even safer.

Moreover, the invention relates to a computer program comprising program code instructions for the execution of the steps of this method when said program is run by a computer, for example the processing unit 6, or computer program product that can be downloaded from a communication network and/or stored on a computer-readable data medium and/or executed by a computer.

The invention relates also to a computer-readable data storage medium, on which is stored a computer program comprising program code instructions for implementing the method as previously explained or a computer-readable storage medium comprising instructions which, when they are executed by a computer, cause the latter to implement the method according to the invention.

The present invention thus proposes a method for the secure display of information in a vehicle fitted with a driving assistance system allowing the detection of a connected infrastructure element, likely to have a plurality of statuses, and the estimation of a temporal proximity with said infrastructure element, the method implementing the securing of the display of information relating to driving events displayed on a display module of the system. The method thus makes it possible to focus the attention of the driver on the traffic lanes and the traffic, thereby making his or her driving safer.

The present invention should not however be limited to the means and configurations described and illustrated here and it extends equally to any equivalent means or configuration and to any technically operative combination of such means in as much as they ultimately fulfil the functionalities described and illustrated in the present document.

The invention claimed is:

1. A method for securely displaying information in a vehicle fitted with a driving assistance system, the method comprising: detecting an infrastructure element; transmitting data relating to the infrastructure element to the vehicle and displaying information relating to driving events on a display module of the driving assistance system as a function of said transmitted data; locating the vehicle relative to the infrastructure element; estimating, in real time, a time remaining for the vehicle to reach the infrastructure element taking into account a longitudinal speed of the vehicle; securing the display of information, the securing comprising checking an alertness of a driver of the vehicle by a driver state monitoring unit in response to the remaining time separating the vehicle from the infrastructure element is equal to a predetermined limit time separating the vehicle from the infrastructure element; switching off the displaying information on the display module and the securing is triggered when the remaining time separating the vehicle from the infrastructure element is equal to the predetermined limit time separating the vehicle from the infrastructure element and the driver state monitoring unit determines that the driver is alert; and maintaining the display information on the display module when the driver state monitoring unit determines that the driver is not alert; wherein the securing is implemented such that the display information is only switched off when the speed of the vehicle is greater than or equal to a predetermined speed, the displaying information on the display module remaining switched off until the time remaining for the vehicle to reach the infrastructure element is zero or the data relating to the infrastructure element indicates that the vehicle has passed the infrastructure element such that the displaying information on the display module is switched back on when the vehicle reaches the infrastructure element, wherein the display information remains switched on when the speed of the vehicle less than the predetermined speed; and updating a status of the infrastructure element including alerting of an imminent change of status of the infrastructure element from a first status to a second status via a first alert signal comprising a first light signal and/or sound signal and/or haptic signal.

2. The method as claimed in claim 1, wherein the infrastructure element is a connected traffic light.

3. The method as claimed in claim 1, wherein the checking the alertness of the driver comprises a phase of monitoring at least one physiological parameter of the driver by at least the driver monitoring unit.

4. The method as claimed in claim 3, wherein the securing the display of information comprises issuing a second alert signal to the driver of the vehicle when a value of the at least one physiological parameter is outside a predetermined threshold value, the second alert signal comprising a second light signal and/or sound signal and/or haptic signal.

5. The method as claimed in claim 1, wherein the predetermined limit time is 2 to 3 seconds.

6. The method as claimed in claim 1, wherein the detecting the infrastructure element comprises selecting the infrastructure element from among a plurality of infrastructure elements according to a position of the infrastructure element relative to a lane and/or roadway traveled by the vehicle and/or according to the spatial and/or temporal proximity of the infrastructure element relative to the vehicle.

7. The method as claimed in claim 1, wherein the predetermined speed is 15 km/h.

8. The method as claimed in claim 1, wherein the updating the status of the infrastructure element comprises: following the alerting, verifying a behavior of the driver by measuring at least one physiological parameter of the driver by the driver state monitoring unit, and when a value of the at least one physiological parameter is less than or equal to a threshold value, reminding the change of status of the infrastructure element and/or of alertness.

9. The motor vehicle driving assistance system comprising: hardware elements and/or software elements configured to implement the method as claimed in claim 1, wherein the hardware elements comprise at least a location means, a means for detecting a connected infrastructure element, a communication module, a data processing unit, the driver state monitoring unit, and the display module of the assistance system.

10. A non-transitory computer readable medium storing a program that, when executed by a computer, causes the computer to execute the method as claimed in claim 1.

11. The method as claimed in claim 1, wherein the switching off includes switching off all information on the display module.

12. The method as claimed in claim 1, wherein the switching off includes switching off all information on the display module related to driving events.

13. The method as claimed in claim 1, wherein, after detecting that the driver is not alert, the switching off the displaying information is implemented in response to the driver state monitoring unit determining that a gaze of the driver is on a traffic lane and not the display module.

* * * * *